INVENTORS
R.A. SANFORD
B.O. AYERS
BY *Young & Quigg*
ATTORNEYS

Jan. 18, 1966   R. A. SANFORD ET AL   3,229,505
PAPER CHROMATOGRAPHY

Filed April 1, 1963   4 Sheets-Sheet 3

INVENTORS
R.A. SANFORD
B.O. AYERS
BY
Young Ed Quigg
ATTORNEYS

Jan. 18, 1966  R. A. SANFORD ET AL  3,229,505
PAPER CHROMATOGRAPHY

Filed April 1, 1963  4 Sheets-Sheet 4

INVENTORS
R.A. SANFORD
B.O. AYERS
BY Young and Quigg
ATTORNEYS

3,229,505
PAPER CHROMATOGRAPHY

Richard A. Sanford and Buell O. Ayers, Bartlesville, Okla., assignors to Phillips Petroleum Company, a corporation of Delaware
Filed Apr. 1, 1963, Ser. No. 269,275
9 Claims. (Cl. 73—53)

This invention relates to paper chromatography. In one aspect the invention relates to a method and means for making a paper chromatographic analysis by detecting and measuring the physical properties of the components of a sample optically.

Paper chromatography has been seriously handicapped because of the difficulty of detecting the results of the separation. Qualitative identifications of zones or band has, in the past, been a difficult laboratory process and quantitative analysis has been nearly impossible. The time required for making an analysis by paper chromatography has been reduced considerably by applying centrifugal acceleration to the chromatograph; however, the necessity for developing the chromatogram so as to make visual observations possible has continued to handicap paper chromatography in many applications.

We have discovered a solution to the problem of paper chromatography which comprises a method and means for optically detecting and measuring the physical properties of the components of the sample being analyzed by paper chromatography. Our invention is particularly applicable to centrifugally accelerated paper chromatography and utilizes the physical properties of radiation refraction and radiation absorption for identifying and measuring the components of the sample.

It is an object of this invention to provide an improved method and means for conducting a paper chromatographic analysis. It is also an object of this invention to provide a method and means for detecting and measuring the component parts of a paper chromatogram. Still another object of this invention is the provision of a method and means for conducting paper chromatographic analysis continuously and automatically. Other objects of the invention will become apparent to those skilled in the art upon study of this disclosure including the detailed description of the invention and the appended drawing wherein:

Figure 1:
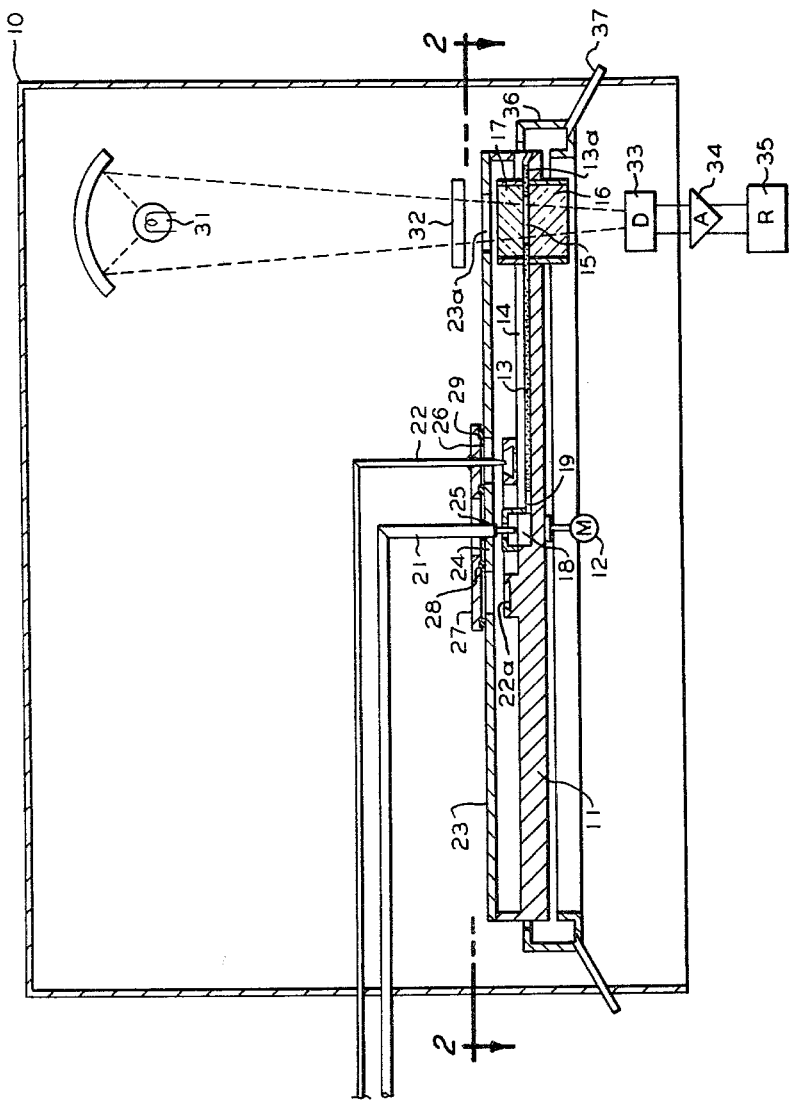
FIGURE 1 is a schematic, sectional illustration of a device according to the invention.
Figure 2:
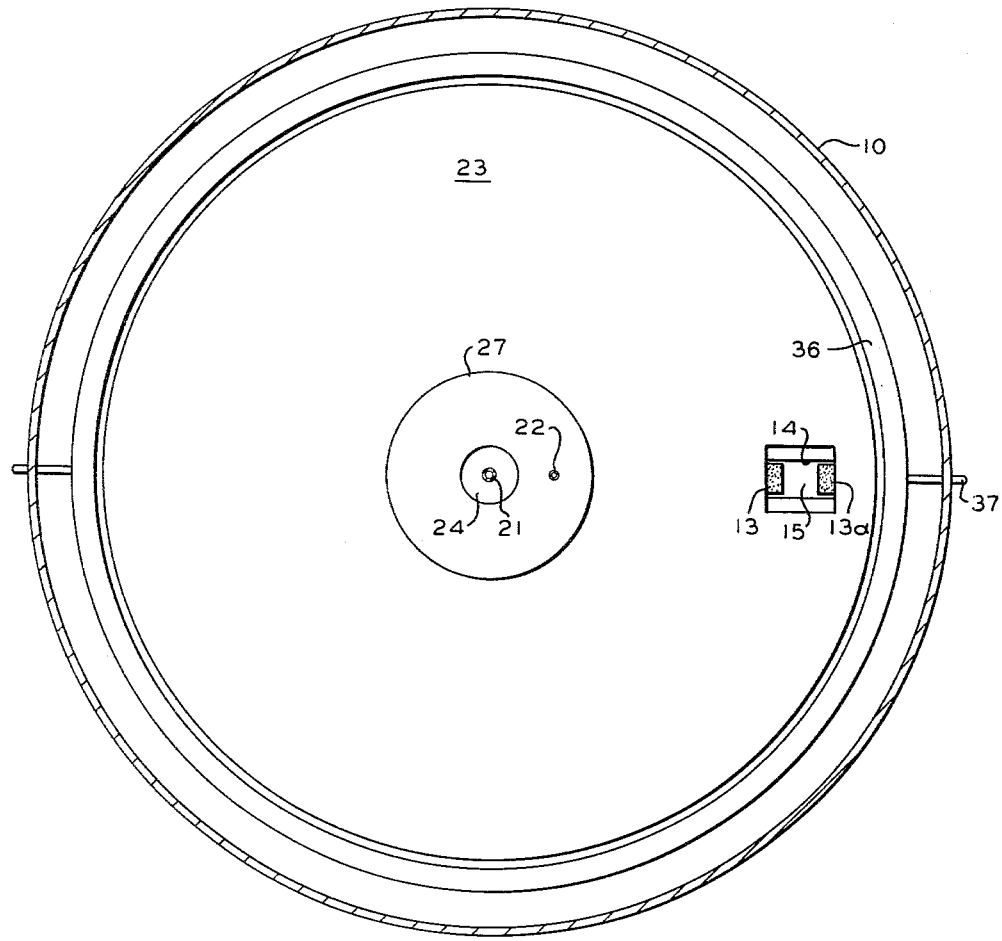
FIGURE 2 is a view along line 2—2 of FIGURE 1.

Referring now to FIGURE 1, a substantially light-tight, vapor-tight case 10 encloses a turntable 11 driven by motor 12 and having paper strip 13 positioned in trough or groove 14 of turntable 11. The paper strip 13 is separated near the end adjacent the periphery of the truntable so as to leave a gap 15 between the principal portion of the paper strip 13 and the remaining end portion 13a. Transparent plates 16 and 17 are secured to turntable 11 so as to sandwich the paper strip, including the gap 15, between them to confine the liquid to the trough and to transmit radiation through the liquid. Plate 16 seals an opening in the bottom of trough 14. The turntable 11 is counter-balanced by any conventional means (not shown) so as to rotate freely and without vibration. A cup 18 is positioned on the top side of table 11 at its center and is in communication with the paper strip 13 by tunnel 19. Liquid is introduced into the cup 18 by conduit 21. Liquid is introduced to the end of the paper strip 13 by means of conduit 22 and circular trough 22a having an opening in the lowest point of the trough directly over the paper strip. A cover 23 encloses the top of the rotating table 11 except for the opening 23a just over the transparent plates 16 and 17 and an opening in the center portion of the turntable 11. The center portion of the turntable 11 is covered by plate 24 which is secured to conduit 21 by means 25 which can be cement, a weld, or other suitable means. Annulus 26 between cover 23 and plate 24 is covered by ring 27 which is secured to conduit 22 by means similar to, or the same as, the means for securing the plate 24 to the conduit 21. Bearing rings 28 and 29 secured to ring 27 provide a seal between the ring 27 and the cover 23 and plate 24. A single plate can be utilized to cover the center opening with both conduits 21 and 22 secured thereto.

The radiation source 31 which can be infrared, ultraviolet or visible light passes radiation through filter 32, transparent plate 17, the liquid in gap 15 and transparent plate 16 to the detector 33. The signal received by the detector 33 is amplified at 34 and transmitted to recorder 35.

Liquid which passes through paper strip 13, gap 15 and the remaining paper strip 13a is collected in gutter 36 and moved by drain conduit 37.

Figure 3:
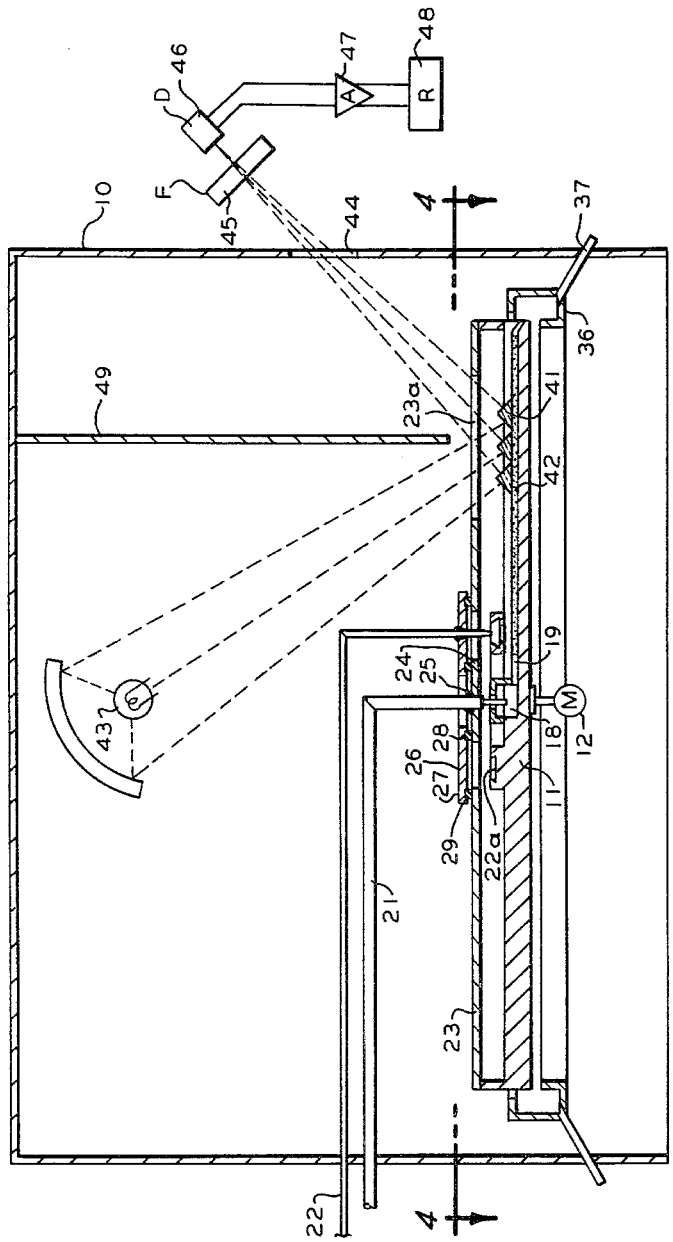
FIGURE 3 is a schematic, sectional illustration of a modification of the device of FIGURE 1.
Figure 4:
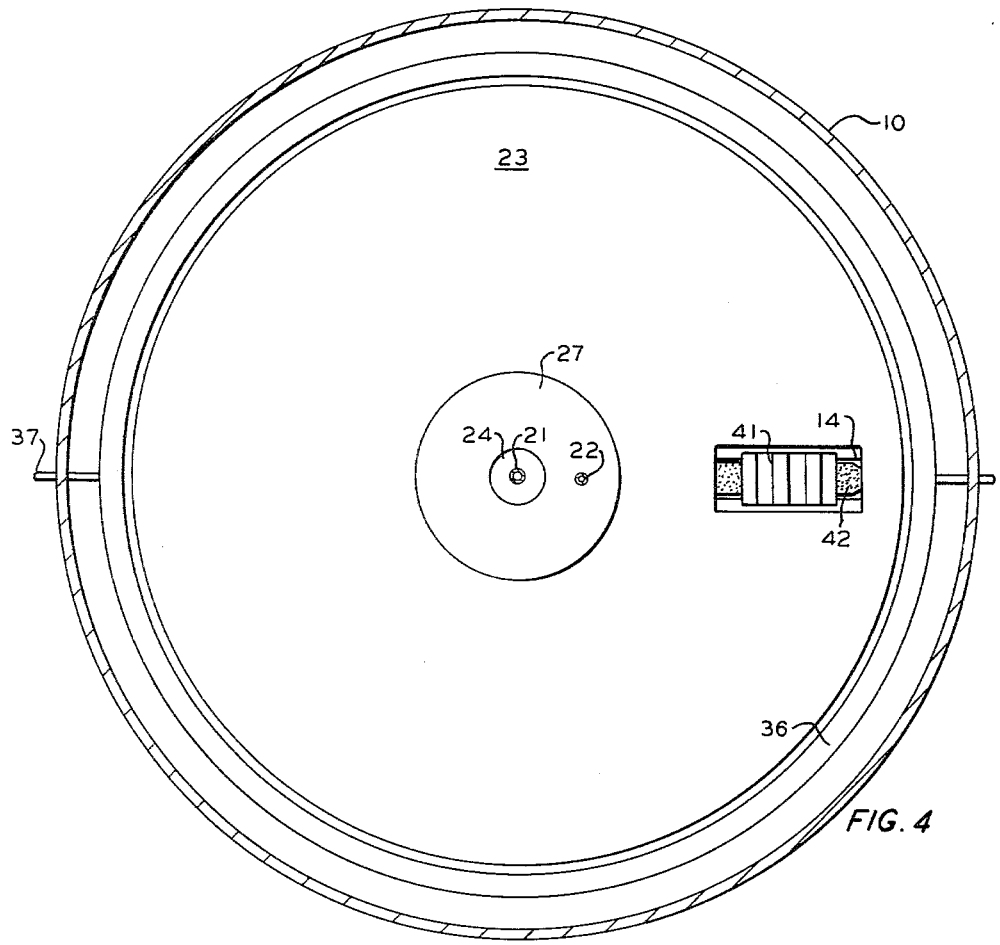
FIGURE 4 is a view along lines 4—4 of FIGURE 3.

In the modification shown in FIGURE 3 a prism 41, which can be a single prism or a plurality of prisms such as a series of parallel prisms pressed or cut into a transparent plate, is positioned on the rotating table 11 so as to be in optical contact with the liquid passing through paper strips 42. Radiation from a source 43 which can be infrared, ultraviolet or visible light, is passed through the prism to the surface of the liquid in contact with the base of the prism and is reflected through aperture 44 in case 10 through filter 45 to detector 46. The signal received by detector 46 is amplified at 47 and is passed to recorder 48. A shield 49 protects the aperture 44 from stray radiation rays. The optics 45 and 46 will be positioned in case 10 or another light-tight case.

The operation of the device of FIGURE 1 will now be described. With the proper paper strip in position in groove 14 the turntable 11 is rotated at the proper speed and the measured amount of sample is introduced to the paper strip by means of the conduit 22 and trough 22a. Solvent or eluting liquid is then admitted via conduit 21 to cup 18 which then travels through tunnel 19 to paper strip 13. The tunnel 19 can be a capillary to control the flow of liquid or the tunnel can be of larger diameter and the flow of liquid can be controlled by interchangeable capillary tips attached to the end of conduit 21. The components of the sample migrate along the paper strip 13 at different rates and are detected as they move across the gap 15 in the paper strip 13 as a result of their effect upon the radiation passing from the radiation source 31 through the gap 15 and to the detector 33.

Sample can also be introduced to the paper strip by stopping the turntable with the paper strip directly under the outlet of conduit 22. Sample can also be introduced as a slug into solvent conduit 21.

After the sample has all been eluted from the paper strip 13, the paper strip can be dried by passing a stream of drying gas through conduit 21, cup 18 and tunnel 19 if drying between determinations is desired. The eluting liquid will often be the solvent or diluent for the sample to be analyzed in which case the drying step between analyses can be omitted. When the eluting liquid and the sample solvent are the same liquid, the filter 32 can conveniently comprise a pair of cells one of which contains the solvent with the other cell containing air, as a "blank" for comparison when sample is present in the paper strip. The filter 32 can also be a monochromator.

Figure 5:
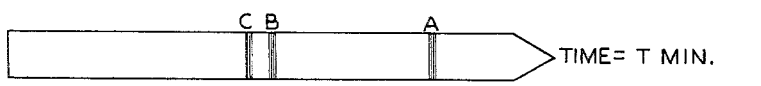
FIGURE 5 is an illustration of the separation of components of a sample along a paper strip and a chromatogram obtained thereby.
Figure 5:
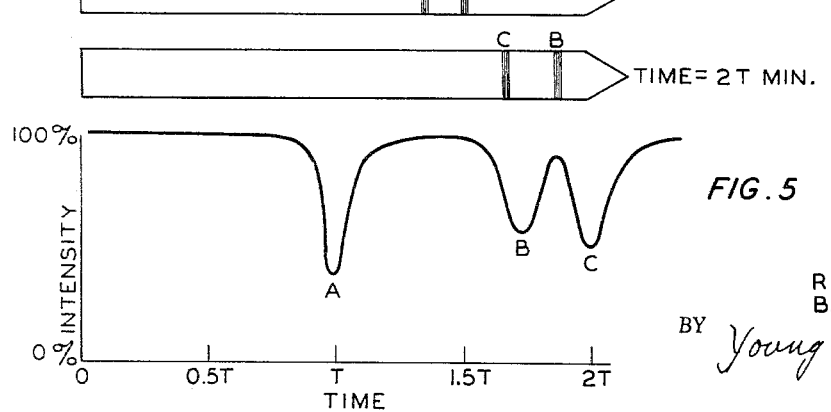

The detector 33, amplifier 34 and recorder 35 are conventional instruments and the analysis can be recorded by recorder 35 as a chromatogram such as that illustrated in FIGURE 5 or the analysis can be recorded in terms of percentage by known means.

The operation of the device of FIGURE 3 is the same as that of the device of FIGURE 1, the only difference being in the optical systems employed. In the device of FIGURE 3 the radiation from radiation source 43 is reflected from the surface of the liquid in the paper strip 42 to the detector 46 by means of the prism or prisms 41.

As an example of a typical analysis performed by means of the device of either FIGURE 1 or FIGURE 3, the product of the radiation-induced reaction of acetaldehyde with ethylene is analyzed in the form of the 2,4-dinitrophenylhydrozone derivatives of the reaction product dissolved in methyl alcohol. A measured amount, for example, 100 micro-liters, of the solution of sample is added to an N,N-dimethylformamide impregnated paper strip by means of the conduit 22 and trough 22a and methyl alcohol is added via conduit 21, cup 18 and tunnel 19 as eluting liquid. The turntable 11 is rotated at a speed selected to obtain maximum rate of migration of the components of the sample and yet provide adequate separation of the bands representative of those components. The rotational speed of the turntable 11 will ordinarily be in the range of 200 to 600 r.p.m. The products determined are the 2,4-dinitrophenylhydrozones of 2-butanone, $R_f$ 0.21; 2-hexanone, $R_f$ 0.37; and 2-octanone, $R_f$ 0.56. Traces of higher methyl n-alkyl ketones of even-numbered carbon chains which are present in the reaction products are ignored in the present analysis. The chromatogram obtained by the detection of the bands representing the components is similar to, but not necessarily the same as, the chromatogram shown in FIGURE 5.

The radiation source is preferably white light or visible light and the detector will ordinarily be a photoelectric cell, for example, a photomultiplier tube. The filter can conveniently comprise a double cell of material transparent to white light, one cell of which contains methyl alcohol whereas the other cell contains air. In this manner the instrument is insensitive to the alcohol solvent and the presence of the ketones is readily detected.

When the optic system uses the reflecting means, as illustrated in FIGURE 3, the principle of attenuated total reflection can be employed. The chromatogram obtained by attenuated total reflection is similar to that obtained by light transmission methods. In some instances the bands can be detected by the property or refractive index when the reflection optic system is employed.

The present invention provides a method for unattended, continuous operation as a process monitoring, quantitative analyzer. The reflection system of optics has been described as applied to paper chromatography but is also applicable to liquid-solid and liquid-liquid chromatography by placing the reflecting means in optical contact with the liquid phase in the wall of the column and utilizing the optic system as described and illustrated in FIGURE 3.

The invention is not limited to visible light but is applicable for use in the ultraviolet and infrared range as well, with suitable radiation sources, detectors and filters.

Although the optic systems have been illustrated and described as being positioned stationary with respect to the rotating table, it is within the scope of the invention to attach the optic system to the rotating table with suitable light choppers or other means to interrupt the radiation from the radiation source. With no light chopper or shield of the light source, a D.C. output can be obtained from the detector.

That which is claimed is:

1. In the method of analyzing mixtures of liquids by paper chromatography wherein a sample of liquid is applied to a strip of paper and is eluted along the strip of paper by a liquid solvent so as to separate the sample into its components, the improvement comprising accelerating the migration of the components along the paper strip by centrifugation; continuously adding solvent to the paper strip; and detecting the separate components of the sample as they pass a selected locus in the paper strip.

2. The method of claim 1 wherein the components of the sample are detected from radiation passed through the sample.

3. The method of claim 1 wherein the components of the sample are detected by radiation reflected from the surface of the sample.

4. A chromatographic analyzer comprising a turntable having a cover with an opening adjacent the periphery; means to rotate said turntable at a selected speed; a trough to secure a strip of paper, extending from a point adjacent the center of said turntable to the periphery of the turntable; means to introduce a first liquid through said cover to the end of the trough adjacent the center of the turntable; means to introduce a second liquid through said cover to the trough adjacent and spaced from the introduction of the first liquid; and means to detect and measure optical properties of the liquids passing a locus of the trough spaced from and adjacent the peripheral end of the trough.

5. The analyzer of claim 4 wherein the means to detect and measure optical properties comprises a radiation source positioned to pass radiation through the opening of said cover; a filter positioned between said opening and said source; a transparent window in the bottom of said trough; a detector positioned to receive radiation passed through said window and to generate a signal representative of the radiation absorption properties of liquid passing through said trough; and a recorder operatively connected to said detector to record signals passed by said detector.

6. The analyzer of claim 5 wherein the means to detect and measure optical properties comprises a radiation source positioned to pass radiation through the opening of said cover; a filter positioned between said opening and said source; reflecting means in optical contact with the liquid in the paper in said trough; a detector positioned to receive radiation reflected from said reflecting means and to generate a signal representative of optical properties of the liquid in said paper; and a recorder operatively connected to said detector to record signals passed by said detector.

7. The method of analyzing a liquid containing a plurality of component parts which comprises applying a sample of said liquid to a strip of paper; eluting the sample along the strip of paper with a solvent so as to separate the liquid into its component parts; accelerating the migration of the components along the strip by centrifugation; continuously adding eluting solvent to said strips; and detecting the separate components of the sample as they pass a selected locus in the paper strip.

8. The method of claim 7 wherein components of the sample are detected from radiation passed through the sample.

9. The method of claim 7 wherein the components of the sample are detected by radiation reflected from the surface of the sample.

References Cited by the Examiner

UNITED STATES PATENTS 2,986,280  5/1961  Manguson et al. ____ 73—53 X
3,009,388  11/1961  Polanyi _____ 88—14

FOREIGN PATENTS 463,391  2/1950  Canada.
591,359  1/1960  Canada.

OTHER REFERENCES

Heftman: Chromatography, Reinhold Publishing Co., New York, 1961, pages 149–150.

LOUIS R. PRINCE, *Primary Examiner.*

RICHARD QUEISSER, *Examiner.*